US011106399B2

(12) United States Patent
Kurata

(10) Patent No.: US 11,106,399 B2
(45) Date of Patent: Aug. 31, 2021

(54) PRINTING CONTROL METHOD WITH PRINTING TARGET DATA GENERATION, STORAGE MEDIUM AND INFORMATION PROCESSING APPARATUS

(71) Applicant: CANON KABUSHIKI KAISHA, Tokyo (JP)

(72) Inventor: Yasuo Kurata, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/416,341

(22) Filed: May 20, 2019

(65) Prior Publication Data

US 2019/0361637 A1 Nov. 28, 2019

(30) Foreign Application Priority Data

May 24, 2018 (JP) .............................. JP2018-099526

(51) Int. Cl.
*G06K 15/02* (2006.01)
*G06F 3/12* (2006.01)

(52) U.S. Cl.
CPC ............ *G06F 3/1205* (2013.01); *G06F 3/125* (2013.01); *G06F 3/1256* (2013.01); *G06F 3/1276* (2013.01); *G06F 3/1284* (2013.01)

(58) Field of Classification Search
None
See application file for complete search history.

(56) References Cited

U.S. PATENT DOCUMENTS

| | | | |
|---|---|---|---|
| 8,373,889 B2* | 2/2013 | Arai ...................... | G06F 3/1204 358/1.18 |
| 9,058,140 B2 | 6/2015 | Kurata et al. | |
| 9,075,553 B2 | 7/2015 | Kurata | |
| 9,223,526 B2* | 12/2015 | Sawada ................. | G06F 3/1253 |
| 9,690,527 B2 | 6/2017 | Kurata | |
| 10,241,730 B2* | 3/2019 | Sugimoto ............. | G06F 3/1285 |
| 10,613,804 B2* | 4/2020 | Ishii ...................... | G06F 3/1258 |
| 10,958,799 B2* | 3/2021 | Yuki ..................... | H04N 1/00482 |
| 2007/0013935 A1* | 1/2007 | Uchida ................. | G06F 3/1286 358/1.13 |
| 2010/0073724 A1* | 3/2010 | Kurata .................. | G06F 3/1276 358/1.15 |
| 2010/0245922 A1* | 9/2010 | Arai ....................... | G06F 3/125 358/1.18 |

(Continued)

FOREIGN PATENT DOCUMENTS

WO 2009/154227 A1 12/2009

*Primary Examiner* — Henok Shiferaw
(74) *Attorney, Agent, or Firm* — Venable LLP

(57) ABSTRACT

A printing control method is performed by an information processing apparatus including a predetermined application capable of requesting first software to output a print file and includes an input step of inputting an output size specified by a user, a determination step of determining a file name of the print file, based on the inputted output size, and an instruction step of instructing the predetermined application to request the first software to output the print file which includes data created by the predetermined application and has the determined file name. In addition, printing target data corresponding to the data created by the predetermined application is generated, with a size corresponding to the output size, based on the file name.

19 Claims, 15 Drawing Sheets

(56) References Cited

U.S. PATENT DOCUMENTS

| | | | |
|---|---|---|---|
| 2014/0092399 A1* | 4/2014 | Sawada | G06F 3/1285 |
| | | | 358/1.2 |
| 2015/0242173 A1 | 8/2015 | Kurata et al. | |
| 2017/0039014 A1* | 2/2017 | Mori | H04N 1/00347 |
| 2017/0262238 A1 | 9/2017 | Kurata | |
| 2018/0260181 A1 | 9/2018 | Shiohara et al. | |

* cited by examiner

```
Word.Document.PrintOut(
 OutputFileName:="C:¥¥Work¥¥WordPlugin_XXXX_YYYY.prn,
 PrintToFile:=True
)
```

FIG.10

PRINTING CONTROL METHOD WITH PRINTING TARGET DATA GENERATION, STORAGE MEDIUM AND INFORMATION PROCESSING APPARATUS

BACKGROUND OF THE INVENTION

Field of the Invention

The present invention relates to a printing control method, a storage medium, and an information processing apparatus.

Description of the Related Art

There exists an application that discloses a method for extending the function of the application itself. As such an application, mention is made of, for example, Microsoft Office (Microsoft Corporation in US) and Microsoft Internet Explorer (Microsoft Corporation in US). It is possible for these applications to provide an additional function to a user by the user installing and registering an additional program in accordance with a disclosed method. Then, the additional program such as this for providing an additional function to an application is generally called a plug-in (program).

As a method for reducing complicated setting work necessary for an application in a case where printing is performed on a large-sized sheet whose size exceeds a general regular size, such as a long sheet and a banner, by making use of the technique, the technique described in International Publication No. 2009/154227 has been proposed.

FIG. 15 is a block diagram showing an outline configuration of the system in International Publication No. 2009/154227. As shown schematically, plug-in software 1502 has a maximum sheet size information storage unit 1503 inside thereof. The maximum sheet size information storage unit 1503 is a module for storing information on the maximum sheet size supported by an application 1501.

The plug-in software 1502 makes it possible to perform printing for a sheet whose size is one desired by a user even in a case where the size of the sheet the user desires to output from a printer 140 exceeds the maximum sheet size. Specifically, the plug-in software 1502 calculates a size whose length-to-width ratio is the same as that of the size a user desires to output within the maximum sheet size and sets the size to the application 1501. Further, the plug-in software 1502 performs magnification/reduction setting for a printer driver 1504 so that printing is performed with a size desired by the user based on the size set to the application 1501.

SUMMARY OF THE INVENTION

However, International Publication No. 2009/154227 has such a problem as follows. First, in International Publication No. 2009/154227, as a method of performing magnification/reduction setting from the plug-in software 1502 via the printer driver 1504, print setting is performed without opening the setting screen of the printer driver 1504. In order to do so, it is necessary to mount an extension API for the above-described print setting, on a print driver.

Consequently, in view of the above-described problem, an object of the present invention is to provide a technique capable of transmitting an arbitrary print setting from an application to a more general printer driver.

The present invention is a printing control method performed by an information processing apparatus including a predetermined application capable of requesting a printer driver to output a print file with a predetermined file name, and the printing control method include: an input step of inputting an output size specified by a user; a first instruction step of instructing the predetermined application to request a first printer driver to output a print file including data created by the predetermined application with a file name corresponding to an output size input at the input step, wherein printing target data corresponding to the data created by the predetermined application is generated, with a size corresponding to the output size, based on the file name; and a second instruction step of instructing a second printer driver to perform printing of the generated printing target data in accordance with a print setting corresponding to the output size for the printing target data.

Further features of the present invention will become apparent from the following description of exemplary embodiments with reference to the attached drawings.

BRIEF DESCRIPTION OF THE DRAWINGS

FIG. 10 is a command sentence used in a case where a module of the plug-in instructs a virtual printer driver to perform printing via the application;

DESCRIPTION OF THE EMBODIMENTS

In order for the application 1501 to instruct the printer driver 1504 to perform printing by using a print setting generated via the extension API, it is necessary to replace the print setting stored by the application 1501. However, for example, in a case of Microsoft Office, plug-in software as a standard method for switching the print setting is not disclosed, and therefore, it is necessary to adopt a method other than the plug-in software. As an example of another method, it is considered to switch the print setting by temporarily changing the standard print setting registered as system information on a PC 100 and causing the application 1501 to refer to this. However, in a case where the method such as this is adopted, the system information is changed temporarily, and therefore, there is a case where another application is also affected.

In the following, embodiments of the present invention are explained in detail with reference to the drawings. However, the following embodiments are not intended to limit the present invention more than necessary and all combinations of features explained in the following embodiments are not necessarily indispensable to the solution of the present invention. Explanation is given by attaching the same symbol to the same configuration. Further, the relative arrangement, shapes, and the like of components described in the following are merely exemplary and the scope of the present invention is not intended to be limited only to those.

First Embodiment

<About Hardware Configuration>

Figure 1:
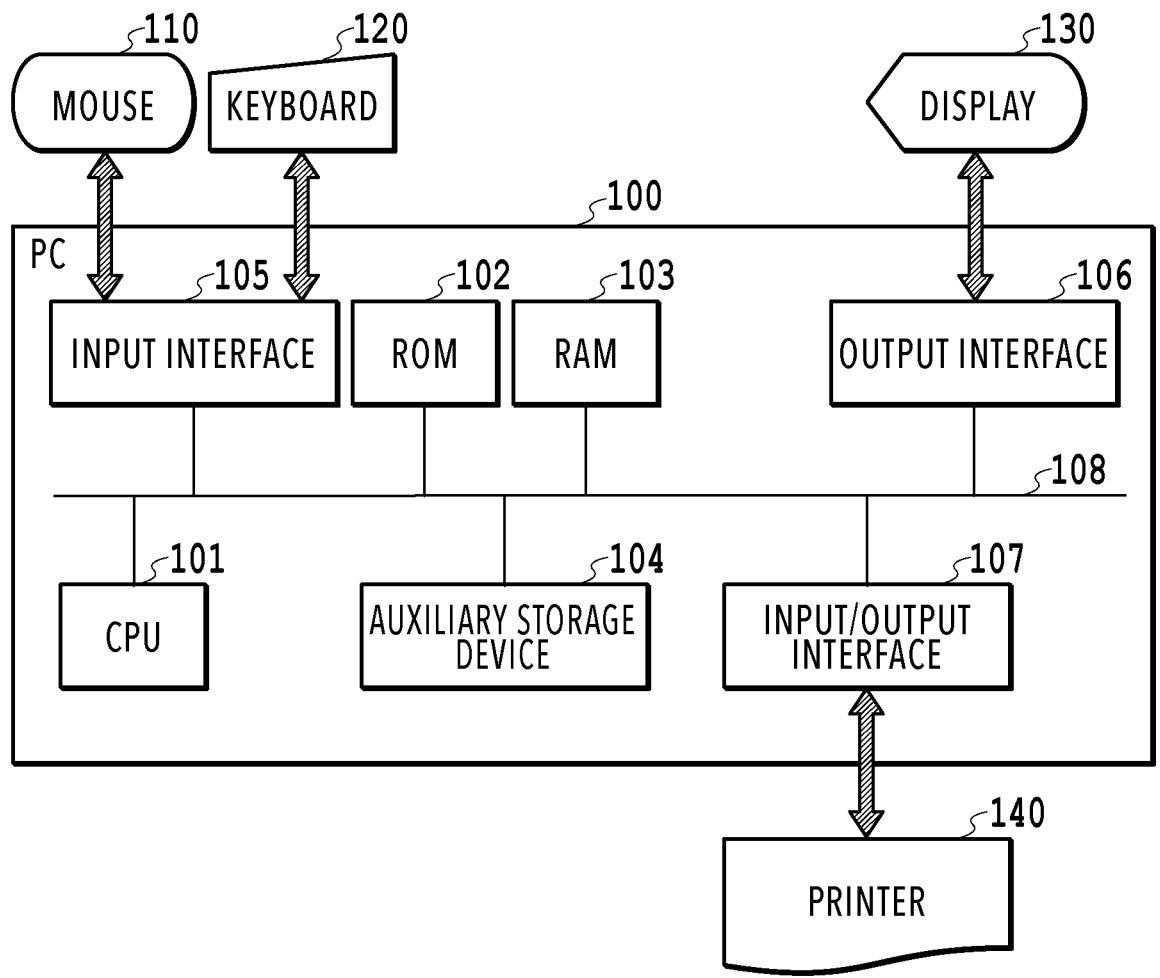
FIG. 1 is a block diagram showing a hardware configuration of an information processing apparatus in a first embodiment.

FIG. 1 is a block diagram showing a hardware configuration of an information processing apparatus in a printing system including an information processing apparatus and a printer in the present embodiment. As an information processing apparatus, mention is made of, for example, a computer, and therefore, hereinafter, an information processing apparatus is described simply as a PC. As shown schematically, the PC 100 has a CPU 101, a ROM 102, a RAM 103, an auxiliary storage device 104, an input interface (hereinafter, interface is abbreviated to IF) 105, an output IF 106, and an input/output IF 107. These components are connected via a bus 108 and capable of performing transmission or reception of data with one another. To the input IF 105, input devices, such as a mouse 110 and a keyboard 120, are connected and the input IF 105 controls inputs from these input devices. The input devices, such as the mouse 110 and the keyboard 120, are used for a user to perform various inputs (user operations) for an icon, a menu, or another object, which are displayed on a display 130 by performing an application or a plug-in. To the output IF 106, output devices, such as the display 130, are connected and the output IF 106 controls outputs to the output devices. To the input/output IF 107, a printer 140 is connected and the input/output IF 107 controls inputs and outputs for the printer 140.

In the ROM 102, programs and data for initialization are stored. In the auxiliary storage device 104, an application program group, plug-ins, an OS, printer drivers, virtual printer drivers, and other kinds of data are stored. The RAM 103 is a storage medium temporarily storing data and functions as a main memory and a work area of the CPU 101. Specifically, for example, various programs stored in the ROM 102 or the auxiliary storage device 104 are loaded onto the RAM 103 and the loaded programs are executed by the CPU 101. In the present embodiment, programs stored in at least one of the ROM 12 and the auxiliary storage device 104 are loaded onto the RAM 103 and the CPU 101 executes the loaded programs. Due to this, functions, to be described later, in the PC 100 are implemented and the processing in accordance with flows, to be described later, is performed.

The printer 140 is connected with the PC 100 via the input/output interface 107 and the PC 100 transmits a print job including print data that the printer 140 can interpret to the printer 140. The printer is not limited to a dedicated device specialized in the printing function and includes a multi-function printer combining the printing function and other functions, a production device that forms an image and a pattern on a printing medium, and the like. In the following explanation, a case is explained as an example where the printer 140 prints an image on continuous paper, such as roll paper. However, the case is not limited to this and there may be a case where the printer 140 prints an image on a cut sheet.

<About Software Configuration>

Figure 2:
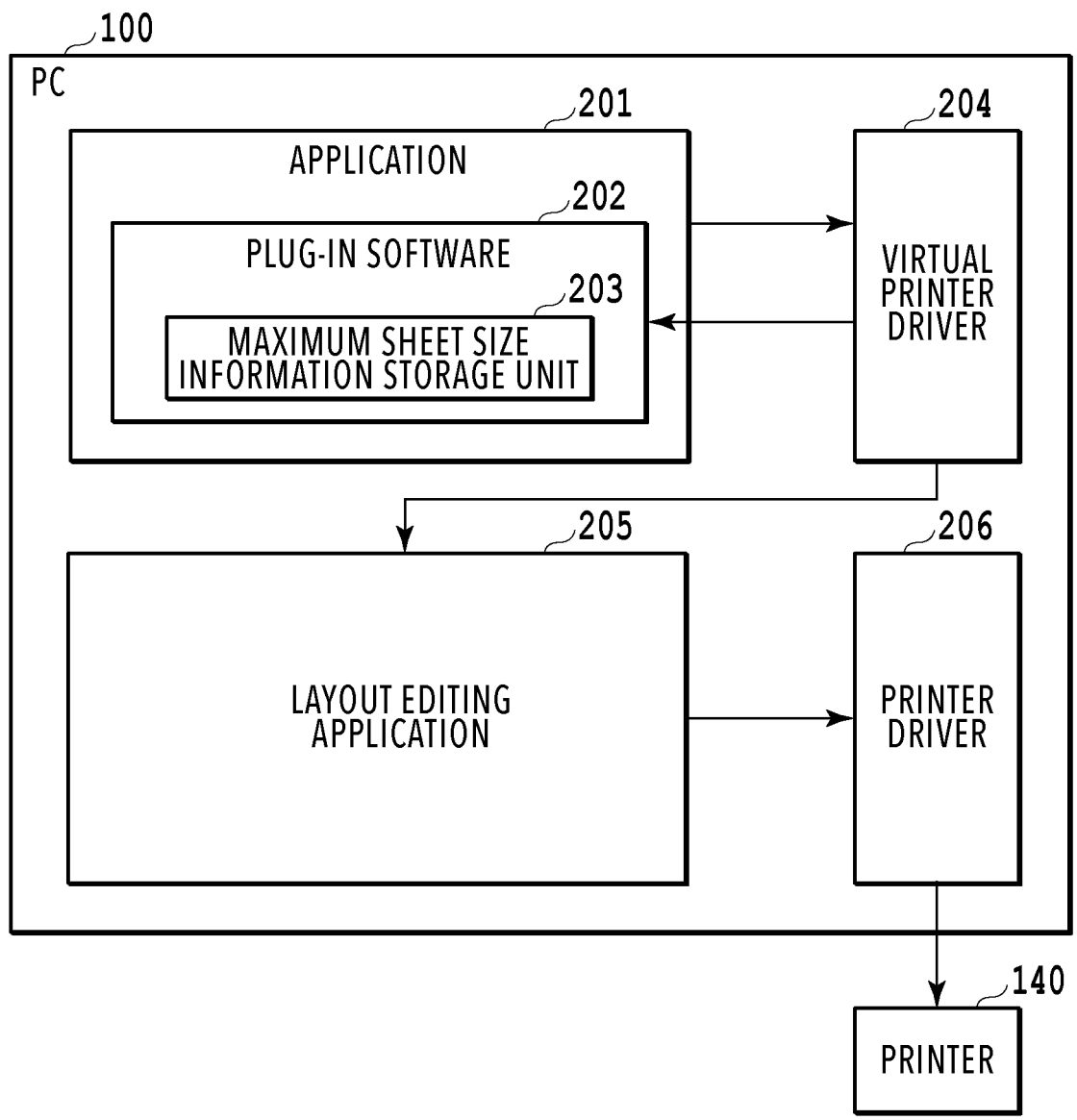
FIG. 2 is a block diagram showing a software configuration of the information processing apparatus in the first embodiment.

FIG. 2 is a block diagram showing a software configuration of the PC 100 of the printing system in the present embodiment. Symbol 201 indicates an application that runs on the PC 100. In an example (hereinafter, called embodiment example) used for explanation in the present specification, explanation is given by taking Microsoft Word (hereinafter, simply called application) as an example as a general-purpose application. Microsoft Word is an application of Microsoft Corporation in US and an application used to create a common document or a document of printed matter and a method of incorporating an additional function is disclosed.

Symbol 202 indicates an extension unit configured to extend the function of the application, that is, plug-in software (hereinafter, simply called plug-in). The plug-in 202 runs on the application 201 and changes the setting of the application 201, instructs a virtual printer driver 204 to perform printing via the application 201, as will be described later, and so on.

Symbol 203 indicates a maximum sheet size information storage unit. The maximum sheet size information storage unit 203 is one module in the plug-in 202 and stores information (called maximum sheet size information) relating to the maximum sheet size. The maximum sheet size is information indicating the maximum sheet size that can be set in the application 201 and includes a value of width and a value of length. The maximum sheet size information stored by the maximum sheet size information storage unit 203 is made use of in processing, to be described later. The maximum sheet size in the application (Microsoft Word) adopted in the present embodiment is a width of 55 cm and a length of 55 cm.

Here, as the application, Microsoft Word is taken, but the application is not limited to this. It is possible to apply the present embodiment to any system having an application that provides an extension unit equivalent to that of Microsoft Word.

Symbol 204 indicates a virtual printer driver given instructions to perform printing by the application 201 via the operation system (hereinafter, called OS). In the printing system in the present embodiment, the virtual printer driver 204 is provided separately from a printer driver 206 connected with the printer 140 and instructing the printer 140 to perform printing. Further, this printing system does not have a configuration in which in a case where printing by the plug-in software 202 is performed, printing instructions from the application 201 are received by the printer driver 206 directly connected with the printer 140. The configuration is such that the virtual printer driver 204 provided in the previous stage of the printer driver 206 receives printing instructions.

The plug-in software 202 is provided by a Web server, not shown schematically, and it is possible to download the plug-in software 202 by accessing the Web server via the Web browser, not shown schematically, included in the PC 100. Further, by this Web server, the installer of the plug-in software 202, the virtual printer driver 204, and a layout editing application 205, to be described later, are also provided. Then, at the time of downloading the plug-in software 202, the installer thereof, the virtual printer driver 204, and the layout editing application 205 are also downloaded together automatically. Then, by this installer, the plug-in software 202, the virtual printer driver 204, and the layout editing application 205 are installed automatically.

The virtual printer driver 204 having received the printing instructions from the application 201 generates print intermediate data (hereinafter, simply called intermediate data) in the data format independent of the application type and transfers the intermediate data to the layout editing application 205. Generally, the format of the intermediate data is specified by the OS and as the representative format, mention is made of the EMF format, the XPS format, and the like. It may also be possible to use a unique format other than those specified by the OS.

Symbol 205 indicates the application that edits the print layout on a sheet surface by using the intermediate data generated by the virtual printer driver 204. The layout editing application 205 processes intermediate data in accordance with user instructions relating to the print layout. Further, the layout editing application 205 instructs the printer driver 206 connected directly with the printer 140 to perform printing by using already-processed intermediate data. The printer driver 206 converts the intermediate data into print data that can be interpreted by the printer 140 in accordance with the print setting and sends out the print job including the print data to the printer 140.

<About Application>

Figure 3:
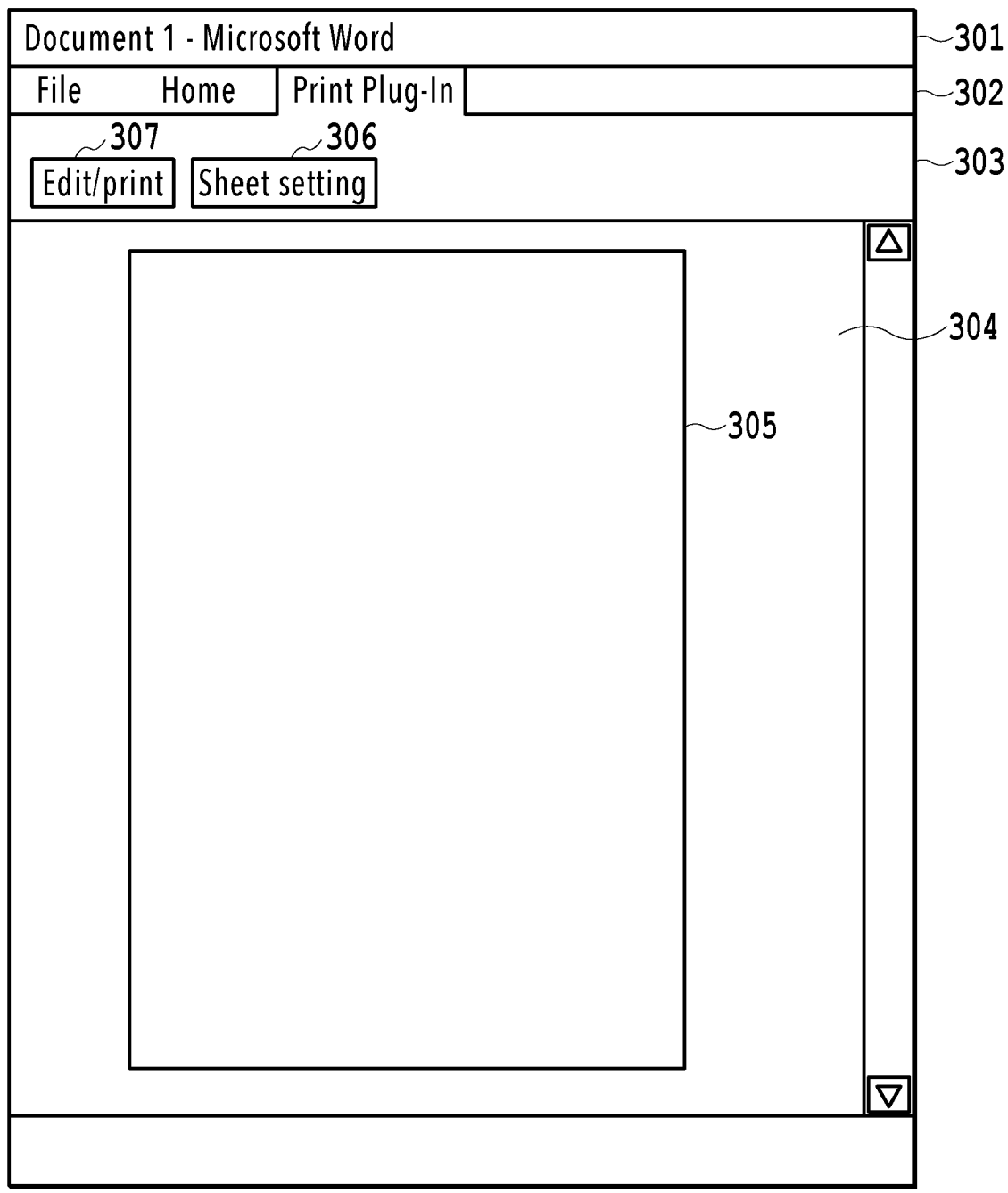
FIG. 3 is a diagram showing a screen in a case where an application is booted.

FIG. 3 is a diagram showing a screen displayed on the display 130 in a case where the application 201 is booted. This screen includes a title bar 301, a menu bar 302, a ribbon 303, and a document display area 304. On the title bar 301, the title of a document currently being created, the application name, and the like are displayed. On the menu bar 302, menus that can be selected by a user, such as "File" and "Home", are displayed. On the ribbon 303, buttons corresponding to the functions possessed by the application 201 and the plug-in 202 are arranged. In the document display area 304, the document currently being created is displayed and in the present embodiment, a document 305 being edited by a user is displayed. Here, it is assumed that A4 (width: 210 mm, length: 297 mm), which is a general setting in the application 201, is set as the sheet size of the document 305.

A Sheet setting button 306 and an Edit/print button 307 arranged on the ribbon 303 are controls displayed on the ribbon 303 by registering the plug-in 202 for the application 201.

<About Output Size Specification Dialog>

Figure 4:
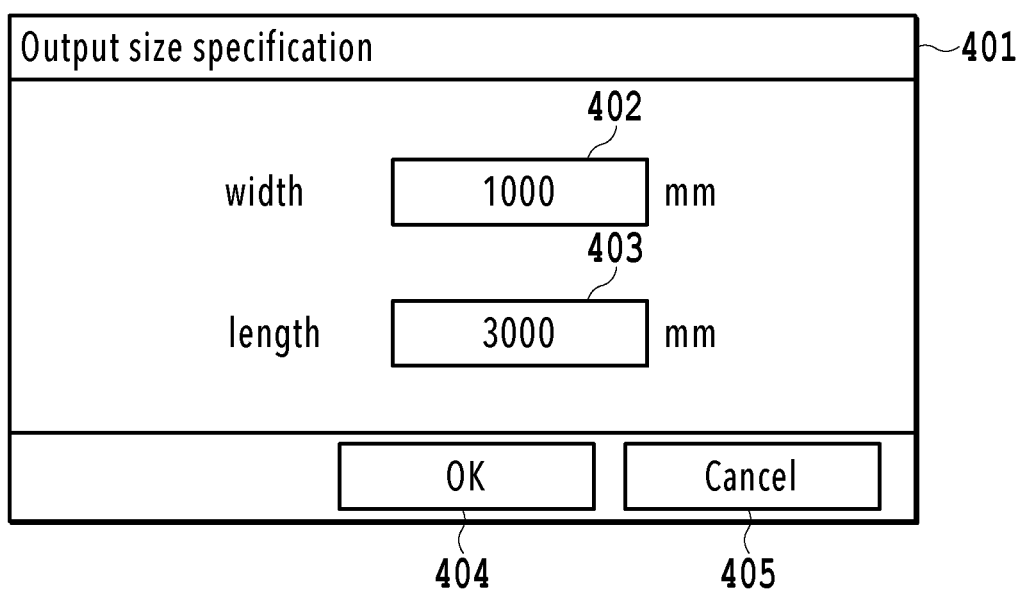
FIG. 4 is a diagram showing an Output size specification dialog.

FIG. 4 is a diagram showing an Output size specification dialog 401 that is displayed by a user pressing down the Sheet setting button 306. In a case where a user presses down the Sheet setting button 306 in the state where the screen shown in FIG. 3 is displayed on the display 130, the screen that receives an input from a user makes a transition from the screen shown in FIG. 3 into the Output size specification dialog 401 and it is no longer possible to change the settings and the like of the application 201.

The Output size specification dialog 401 has a width specification control 402 and a length specification control 403 as controls specifying the size of an output material (hereinafter, called output size) a user desires to print by using the printer 140. A user specifies a width by inputting a numerical value in units of mm to the width specification control 402 and specifies a length by inputting a numerical value in units of mm to the length specification control 403. Here, as shown schematically, it is assumed that 1,000 mm is specified as the width of the output size and 3000 mm is specified as the length of the output size.

It may also be possible for the printer 140 to automatically detect the width of the roll paper set to the printer 140 by a sensor and for the detection results to be reflected on the Output size specification dialog 401. Specifically, the plug-in software 202 accesses the printer 140 via the OS and acquires the width of the roll paper detected by the printer 140 by using the sensor. Then, it may also be possible for the width of the roll paper to be reflected automatically in the width specification control 402. By this configuration, it is possible to more securely specify the width of the roll paper set to the printer 140 as the width of the output size.

A case is explained where a user presses down an OK button 404 in the state where the Output size specification dialog 401 is displayed on the display 130. In this case, the CPU 101 derives the sheet size of the document 305 by the module of the plug-in 202, sets the sheet size in the application 201, stores the output size, and so on. Then, the CPU 101 causes the screen receiving an input from a user to make a transition into the screen of the application 201 from the Output size specification dialog 401 at the same time as closing the Output size specification dialog 401.

On the other hand, in a case where a user presses down a Cancel button 405 in the state where the Output size specification dialog 401 is displayed on the display 130, the contents set by a user on the Output size specification dialog 401 are discarded and the Output size specification dialog 401 is closed. Further, the screen receiving an input from a user makes a transition into the screen (see FIG. 3) of the application 201 from the Output size specification dialog 401.

Figure 5:
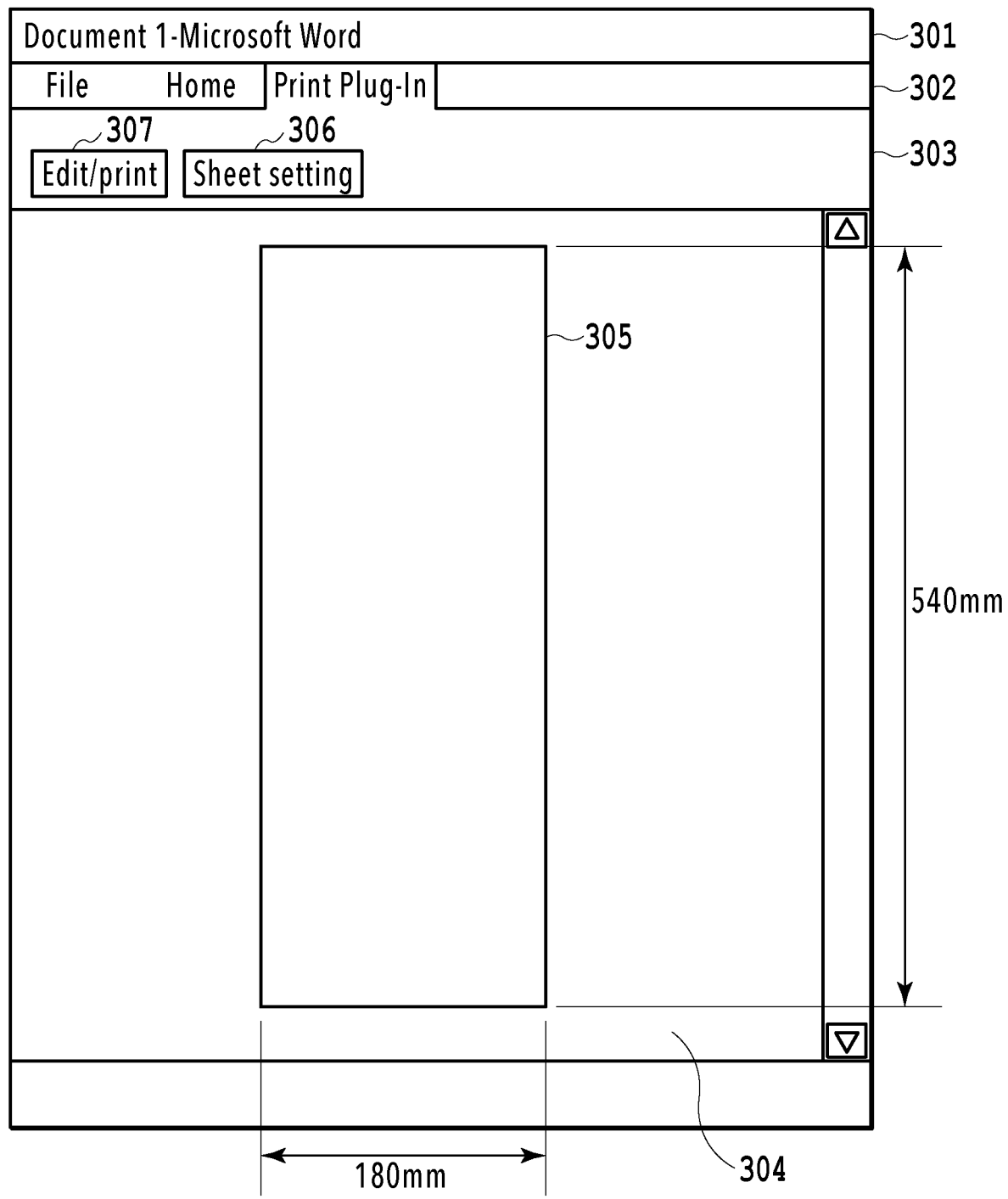
FIG. 5 is a diagram showing a screen of the application after setting of a sheet size is changed.

FIG. 5 shows the state where a user presses down the OK button 404 on the Output size specification dialog 401 shown in FIG. 4 and the screen receiving an input from a user has made a transition into the screen of the application 201 from the Output size specification dialog 401. In the document display area 304, the document 305 in the same length-to-width ratio as the ratio of the length and the width specified on the Output size specification dialog 401 is displayed. Further, at this time, the value of the width and the value of the length specified on the Output size specification dialog 401 are stored in the RAM 103 or the like.

In the state where the screen shown in FIG. 5 is displayed on the display 130, it is possible for a user to arrange an object, such as a character and an illustration, for the document 305. In a case where a document a user desires to print is completed, the user presses down the Edit/print button 307. Then, the CPU 101 instructs the virtual printer driver 204 to perform printing by the module of the plug-in 202 via the application 201. The virtual printer driver 204 having received the printing instructions generates intermediate data as described previously.

<About Processing in Case Where Sheet Setting Button is Pressed Down>

Figure 6:
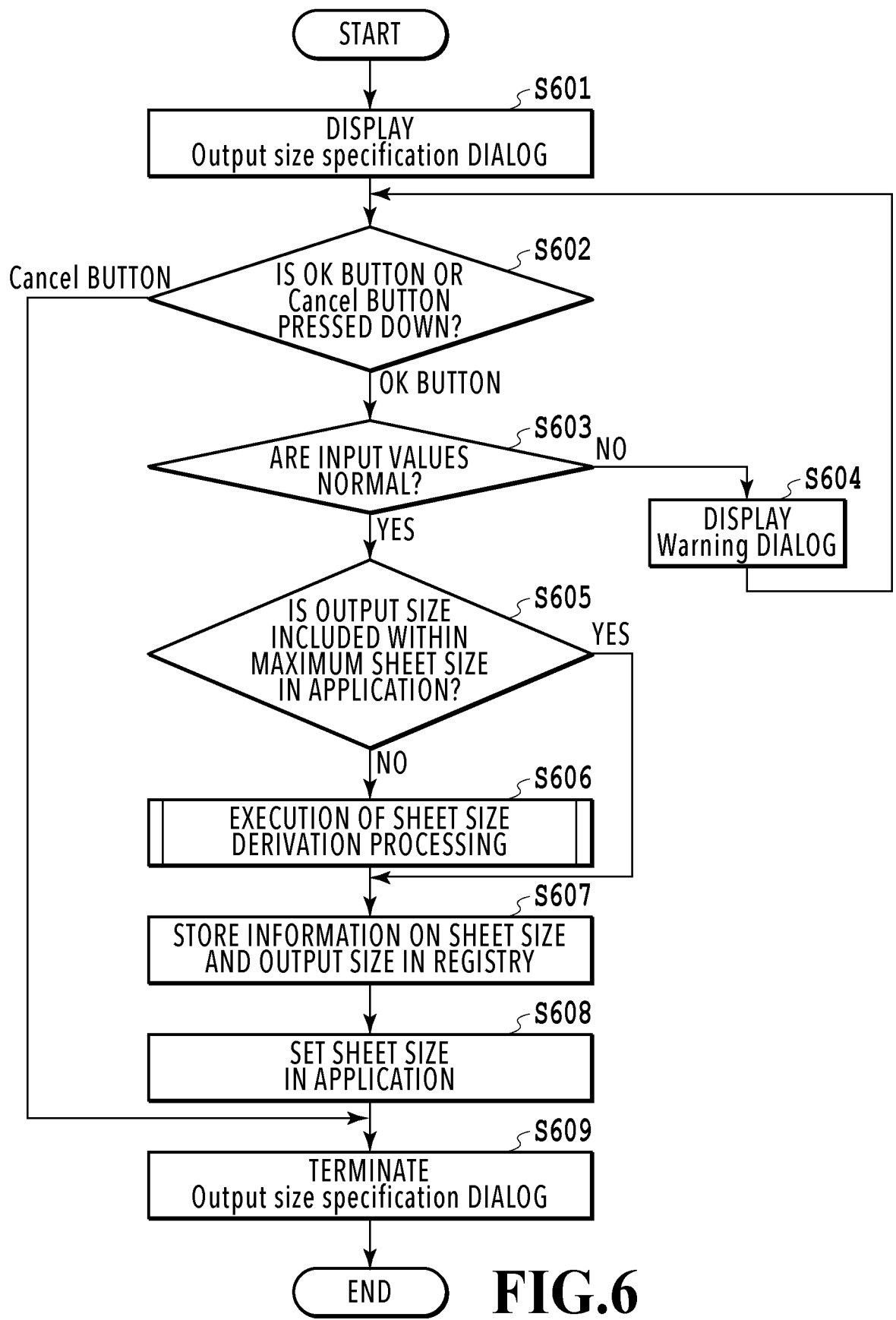
FIG. 6 is a flowchart of a series of operations in a case where a Sheet setting button is pressed down in the first embodiment.

In the following, the series of processing in a case where the Sheet setting button 306 is pressed down is explained by using FIG. 6. Each piece of processing shown in FIG. 6 is performed by the module implemented by the CPU 101 executing the plug-in 202. In a case where a user presses down the Sheet setting button 306, the series of processing is started and the processing advances to step S601. In the following, "step S-" is simply abbreviated to "S-".

At S601, the CPU 101 displays the Output size specification dialog 401 described previously on the display 130.

After this step, the state is brought about where an input of a user to the Output size specification dialog 401 is awaited.

In a case where a user presses down the OK button 404 or the Cancel button 405 on the Output size specification dialog 401, at S602, the CPU 101 determines whether the pressed-down button is the OK button 404 or the Cancel button 405. In a case where the OK button 404 is pressed down, the processing advances to S603 and on the other hand, in a case where the Cancel button 405 is pressed down, the processing advances to S609.

At S603, the CPU 101 acquires the value input to the width specification control 402 and the value input to the length specification control 403. Then, the CPU 101 determines these input values are normal values. Here, for each value of the width and the length, values not normal are specified in advance. The values not normal are, for example, values not represented by numerical values (characters and the like), negative values, values not supported by the printer 140, and the like. Further, also in a case where the OK button 404 is pressed down in the state where no values are input to the controls, determination results at this step will be negative. In a case where determination results at this step are affirmative, the processing advances to S605 and on the other hand, in a case where the determination results are negative, the processing advances to S604.

Figure 7:
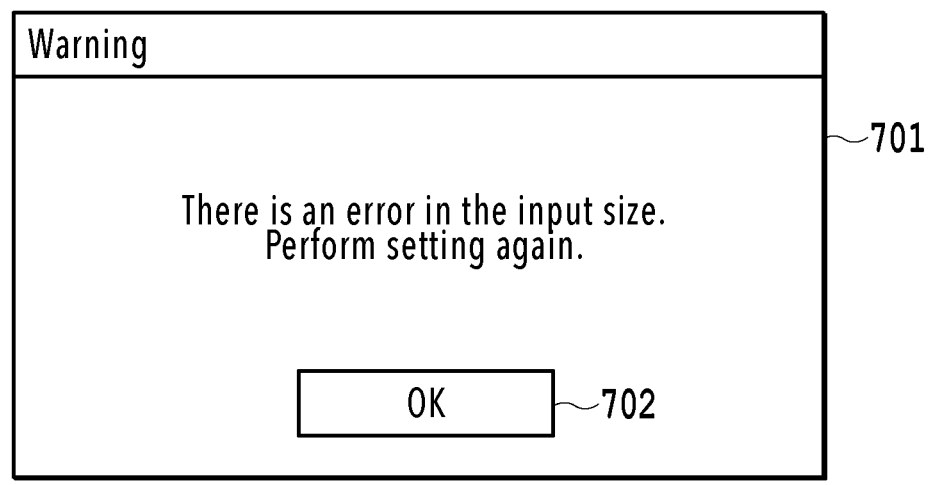
FIG. 7 is a diagram showing a Warning dialog in the first embodiment.

In a case of NO at S603, at S604, the CPU 101 displays a screen indicating that the size specified by the value input to the width specification control 402 and the value input to the length specification control 403 is not normal on the display 130. FIG. 7 is a diagram showing a Warning dialog 701 adopted in the present embodiment as an example of the screen that is displayed at this step. In a case where a user presses down an OK button 702 in the state where the Warning dialog 701 is displayed on the display 130, the processing returns to S602 and the state is brought about again where an input to the Output size specification dialog 401 is awaited.

Following the above, a case of YES at S603 is explained. In the following, explanation is given by taking a case where the width 1,000 mm and the length 3,000 mm are specified via the Output size specification dialog 401 as shown in FIG. 4 and the size specified by these values is supported by the printer 140.

At S605, the CPU 101 functions as an output size determination unit and determines whether the output size specified on the Output size specification dialog 401 is included within the maximum sheet size in the application 201. In a case where determination results at this step are affirmative, the processing advances to S607 without interposition of S606. In this case, the processing to derive the sheet size at step S606 is not performed and the processing that follows is performed by regarding the sheet size as being the same as the output size. On the other hand, in a case where determination results at this step are negative, the processing advances to S606. The determination at this step is performed by comparing the maximum sheet size in the application 201 and the output size input by a user by using the maximum sheet size information stored in the RAM 103 by the maximum sheet size information storage unit 203 of the plug-in 202.

Specifically, the maximum sheet size information storage unit 203 stores information indicating the width and the length, respectively, of the maximum sheet size (maximum page size) that can be set in the application 201. The maximum sheet size information storage unit 203 determines the magnitude relationship between the width specifying the output size and the width specifying the maximum sheet size, and the magnitude relationship between the length specifying the output size and the length specifying the maximum sheet size. Then, in a case where the width specifying the output size is less than or equal to the width specifying the maximum sheet size and the length specifying the output size is less than or equal to the length specifying the maximum sheet size, the maximum sheet size information storage unit 203 determines that the output size is included within the maximum sheet size. On the other hand, in a case where at least one of the condition that the width specifying the output size is greater than the width specifying the maximum sheet size and the condition that the length specifying the output size is greater than the length specifying the maximum sheet size is satisfied, the maximum sheet size information storage unit 203 determines that the output size is not included within the maximum sheet size. In the present embodiment, the maximum sheet size in the application 201 is the width 550 mm and the length 550 mm for the output size (width 1,000 mm, length 3,000 mm) input by a user, and therefore, it is determined that the output size is not included within the maximum sheet size.

At S606, the CPU 101 performs processing to derive the sheet size (referred to as sheet size derivation processing). The sheet size that is derived at this step is the sheet size of the document 305, which the module of the plug-in 202 sets to the application 201. The sheet size derivation processing will be described later by using FIG. 8.

At S607, the CPU 101 stores information on the sheet size derived at S606 and the output size input by a user. Although the storage destination in which the information is stored at this step is not limited in particular, in the PC 100 mounting the Windows OS, mention is made of a registry or the like as a candidate. In the present embodiment also, it is assumed that the information on the sheet size and the output size is stored in a registry.

At S608, the CPU 101 sets the sheet size in the application 201. In the present embodiment, it is assumed that a width of 183.3 mm and a length of 550 mm are set as the sheet size.

At S609, the CPU 101 performs termination processing of the Output size specification dialog 401. Specifically, the CPU 101 closes the Output size specification dialog 401 and causes the screen receiving an input from a user to make a transition into the screen of the application 201 from the Output size specification dialog 401.

<About Sheet Size Derivation Processing>

Figure 8:
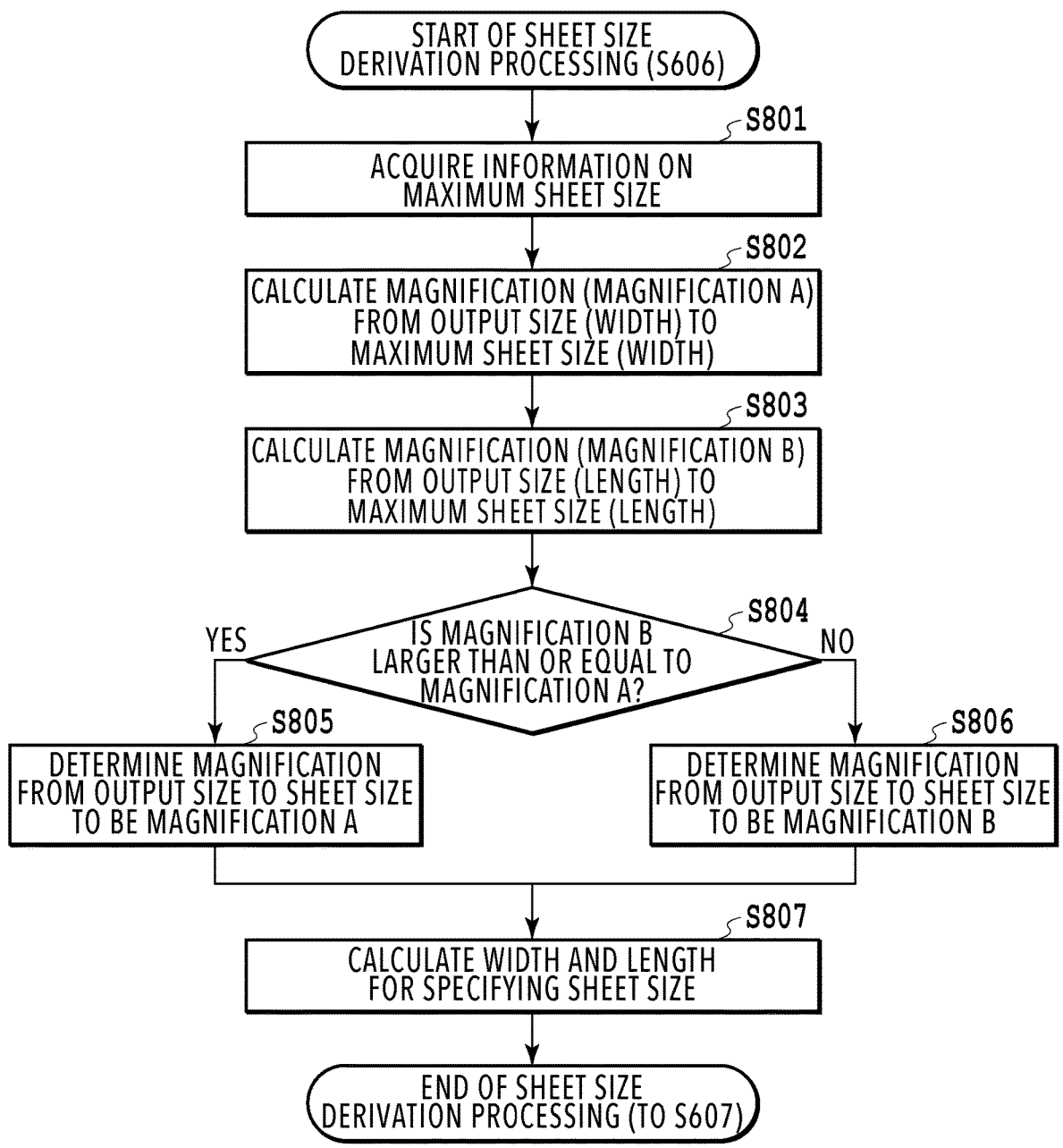
FIG. 8 is a flowchart of sheet size derivation processing in the first embodiment.

FIG. 8 is a detailed flowchart of the sheet size derivation processing (S606 in FIG. 6) in the present embodiment.

At S801, the CPU 101 acquires the information on the maximum sheet size stored in the RAM 103 by the maximum sheet size information storage unit 203, that is, the value of the width and the value of the length, both specifying the maximum sheet size. In the present embodiment, the width 550 mm and the length 550 are acquired.

At S802, the CPU 101 calculates a magnification (referred to as magnification A) from the width of the output size to the width of the maximum sheet size. In the present embodiment, the magnification A is calculated as A=55% (=550 mm/1,000 mm).

At S803, the CPU 101 calculates a magnification (referred to as magnification B) from the length of the output size to the length of the maximum sheet size. In the present embodiment, the magnification B is calculated as B= 18.333 . . . % (=550 mm/3,000 mm).

At S804, the CPU 101 determines whether the magnification A is smaller than or equal to the magnification B. In a case where determination results at this step are affirmative, the processing advances to S805 and on the other hand, in a case where the determination results are negative, the processing advances to S806. In the present embodiment, the magnification A=55% and the magnification B= 18.333 . . . %, and therefore, the determination results at this step are negative and the processing advances to S806.

In a case where the magnification from the width of the output size to the width of the maximum sheet size is smaller than or equal to the magnification from the length of the output size to the length of the maximum sheet size (magnification A≤magnification B), YES is determined at S804 and at S805, the CPU 101 determines the magnification from the output size to the sheet size to be the magnification A. In contrast to this, in a case where the magnification A is larger than the magnification B (NO at S804), at S806, the CPU 101 determines the magnification from the output size to the sheet size to be the magnification B. In the present embodiment, the magnification from the output size to the sheet size is determined to be 18.333 . . . % at S806.

At S807, the CPU 101 calculates the width and the length for specifying the sheet size by multiplying the value of the width and the value of the length, respectively, both specifying the output size specified by a user, by the magnification determined at S805 or at S806. In the present embodiment, the width of the sheet size is calculated as 183.333 . . . mm (=1,000 mm×18.333 . . . %), and the length of the sheet size as 550 mm (=3,000×18.333 . . . %). The above is the contents of the maximum sheet size derivation processing in the present embodiment.

In a case where the width or the length of the sheet size, which is calculated at S807, includes a decimal fraction, at S608, a value in accordance with the page size setting of the application 201 is set. For example, in a case where it is possible to set a value to the tenths place in the application 201, in the above-described example, 183.3 mm is set as the width of the sheet size and 550 mm is set as the length of the sheet size.

According to the processing in FIG. 8 and at S608, it is possible to set the sheet size whose at least one of the width and the length is the maximum (in the above-described example, 550 mm) to the page size setting of the application 201. Due to this, in enlargement processing, to be described later, it is possible to enlarge the size with a smaller enlargement ratio, and therefore, it is possible to reduce the image deterioration due to enlargement.

The processing in FIG. 8 and at S608 is not limited to the example described above and for example, at S802 and S803, it may also be possible to round down the magnification A and the magnification B to the nearest integers, respectively. Then, in the example described above, the magnification B is calculated as 18%. Then, at S807, as the width of the sheet size, 180 mm is calculated and as the length of the sheet size, 540 mm is calculated. In this case also, it is possible to set the length (540 mm) close to the maximum length (550 mm) as the length of the sheet size as the page size of the application 201, and therefore, it is possible to suppress the image deterioration due to enlargement processing, to be described later.

FIG. 5 shows the screen of the application 201 after performing the setting of the sheet size. In the present embodiment, as shown schematically, the set document size, that is, the document 305 whose width is 183.3 mm and whose length is 550 mm is displayed. That is, the aspect ratio is that corresponding to the length and the width specified on the Output size specification dialog 401 and the page of the page setting included within the maximum sheet size is displayed by the application 201. In this state, it is possible for a user to edit the document 305 by arranging an object, such as a character and an illustration, for the document 305. The aspect ratio of the page (document 305) displayed by the application 201 is the aspect ratio of the output size, and therefore, it is possible for a user to edit the document 305, such as arrangement of an object, while clearly imaging printing results. Then, in a case where the document to be printed is completed, the user presses down the Edit/print button 307. In the following, a series of processing in a case where the Edit/print button 307 is pressed down is explained by using FIG. 9 to FIG. 11.

<About Processing Performed on Plug-In Side in Case Where Edit/Print Button is Pressed Down>

Figure 9:
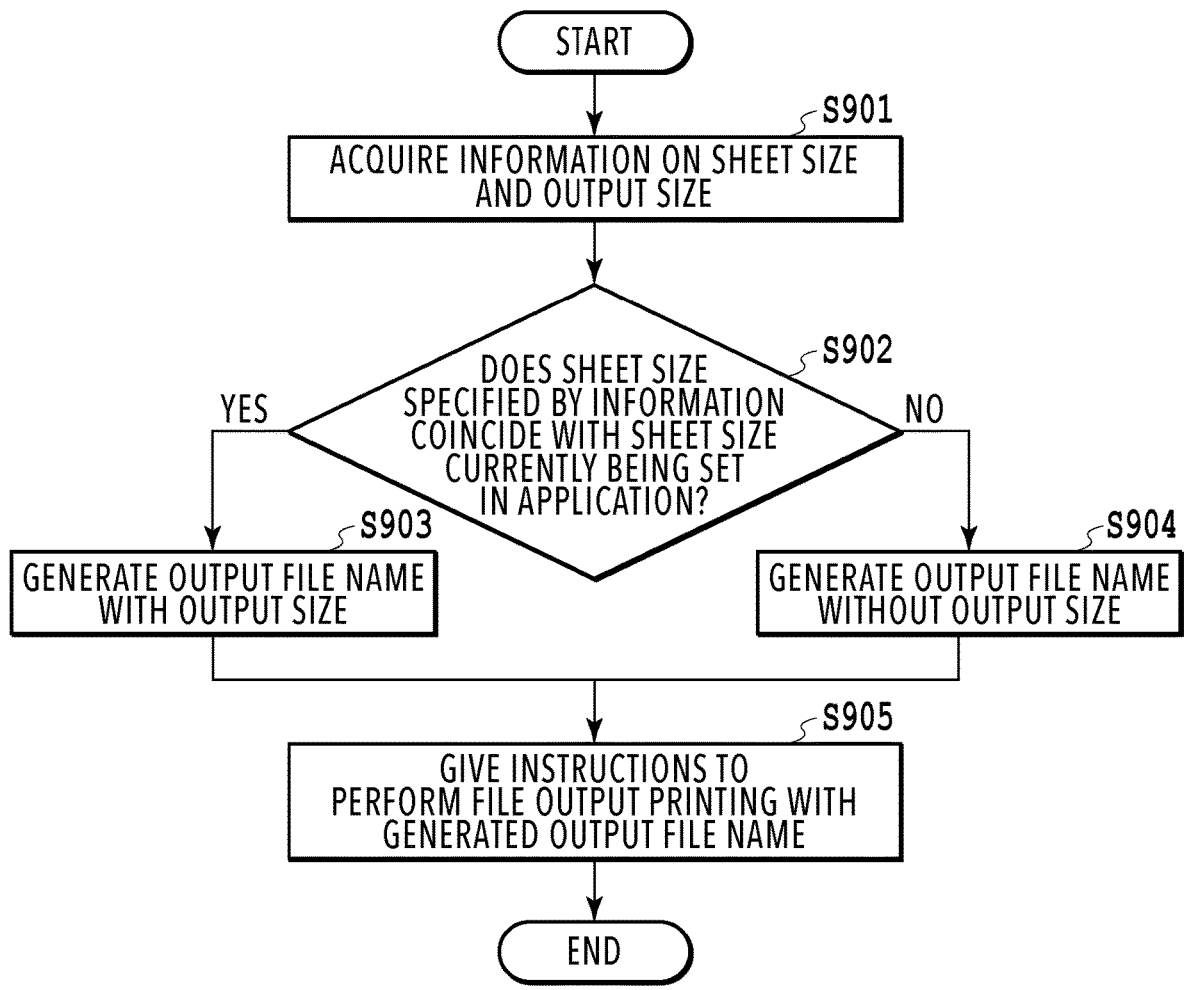
FIG. 9 is a flowchart of processing performed on the side of a plug-in in a case where an Edit/print button is pressed down in the first embodiment.

First, a series of processing performed by the module implemented by the CPU 101 executing the plug-in 202 is explained by using FIG. 9. In a case where a user presses down the Edit/print button 307, the series of processing is started and the processing advances to step S901.

At S901, the CPU 101 acquires the information on the sheet size and output size, which is stored at S607. In the present embodiment, as described previously, this information is stored in the registry, and therefore, the CPU 101 acquires the information on the sheet size and the output size by accessing the registry.

At S902, the CPU 101 compares the sheet size specified by the information acquired at S901 with the sheet size (page size in the page setting) of the document 305 currently being set in the application 201 and determines whether these sheet sizes coincide with each other. In a case where determination results at this step are affirmative, the processing advances to S903 and on the other hand, in a case where the determination results are negative, the processing advances to S904.

After the sheet size is set to the application 201 at S608 described above, in a case where a user edits the document 305 without changing the sheet size and presses down the Edit/print button, YES is determined at S902. On the other hand, after the sheet size is set to the application 201 at S608 and in a case where a user changes the sheet size and presses down the Edit/print button, NO is determined at S902.

In a case of YES at S902, at S903, the CPU 101 generates a file name by using the information on the output size acquired at S901, which the CPU 101 specifies as an output file at the time of instructing the virtual printer driver 204 to perform printing. In the present embodiment, an output file name is generated in a format including an output size width and an output size length as shown in equation (1) below.

WordPlugin_[output size width]_[output size length].prn    equation (1)

In the present embodiment, in a case where the sheet size stored in the registry and the sheet size of the document 305 in the application 201 coincide with each other, it is assumed that an output file name "WordPlugin_1000_3000.prn" is generated in accordance with equation (1).

On the other hand, in a case of NO at S902, at S904, the CPU 101 generates a file name that the CPU 101 specifies as an output file name at the time of instructing the virtual printer driver 204 to perform printing. Different from S903, at this step, an output file name is generated in a format not including an output size width and an output size length. In the present embodiment, in a case where the sheet size stored in the registry and the sheet size of the document 305 in the application 201 do not coincide with each other, it is assumed that an output file name "WordPlugin.prn" is generated.

At S905, the CPU 101 gives instructions to the application 201 by the plug-in software 202 by using the output file name generated at S903 or S904. By the instructions, the application 201 requests the virtual printer driver 204 to output a print file with the output file name. By this request, data (document, image, and the like) created in the application 201 and the file name of the print file are transferred to the virtual printer driver 204 from the application 201. FIG. 10 shows an example of a command sentence used at the time of the module of the plug-in 202 instructing the virtual printer driver 204 to perform printing via the application 201 at S905. As shown schematically, as an argument "OutputFileName" a file path including the output file name generated at S903 or S904 is specified and "True" is specified for an argument "PrintToFile". Due to this, instructions to perform printing accompanied by creation of a print file (so-called file output printing) are given. In a case where the processing at S905 is completed, the series of processing shown in FIG. 9 is terminated. By the processing at S905, the virtual printer driver 204 receives the print job including the data created in the application 201 and the file name from the application 201 via the OS. The above-described file output printing is a function included in the application 201 as a standard function. Further, the application 201 transmits the print job to the virtual printer driver 204 by the same processing as that in a case where the application 201 causes a normal printer driver, such as the printer driver 206, to perform printing. Because of this, it is possible for the application 201 to output a print file to the virtual printer driver 204 even in a case of not including a special function in accordance with the virtual printer driver 204. The above is the contents of the processing performed on the plug-in side in a case where the Edit/print button is pressed down in the present embodiment.

<About Processing Performed on Virtual Printer Driver Side in Case Where Edit/Print Button is Pressed Down>

Figure 11:
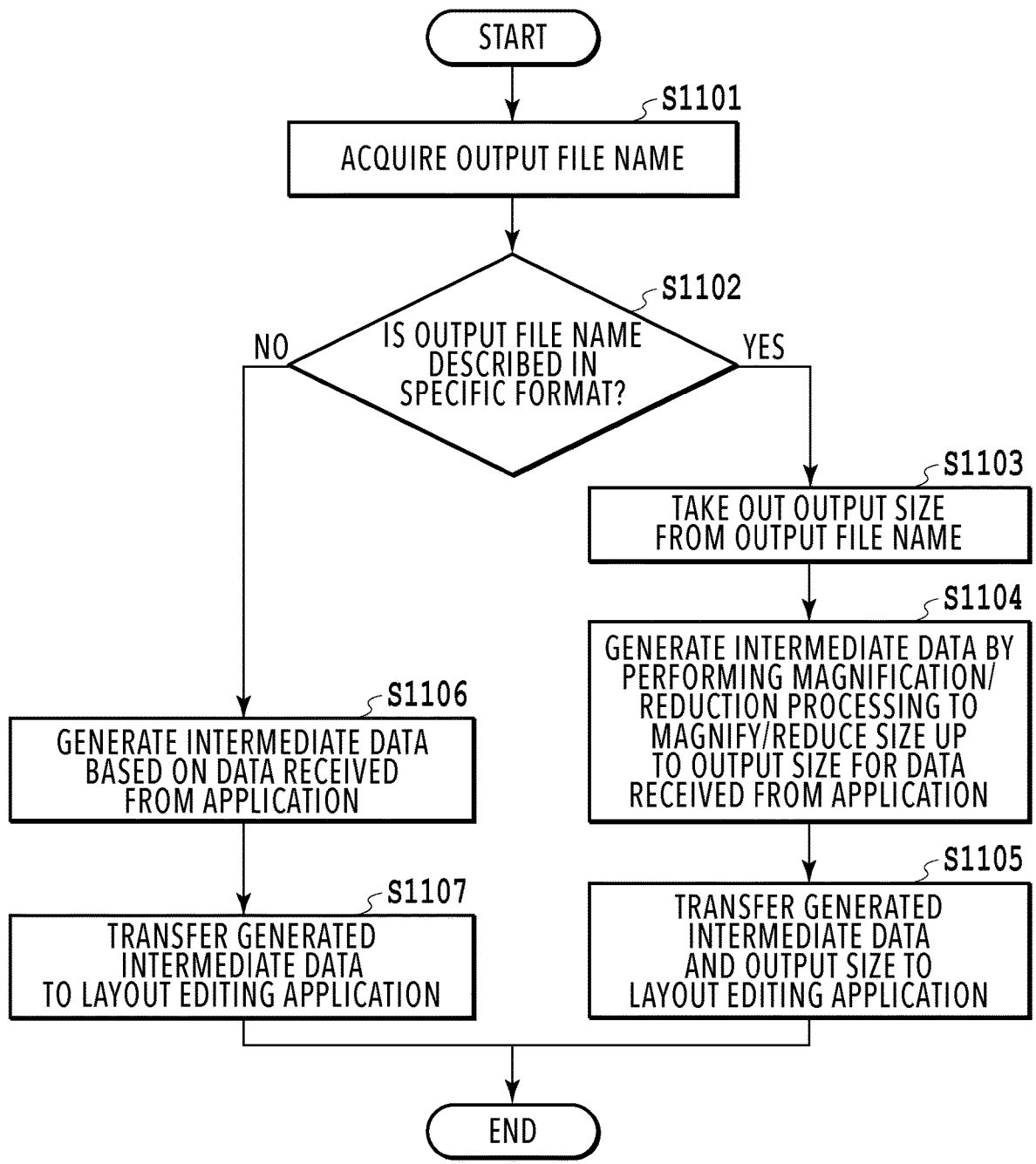
FIG. 11 is a flowchart of processing performed on the side of the virtual printer driver having received a print job in the first embodiment.

In the following, processing performed on the virtual printer driver 204 side having received a print job is explained by using FIG. 11.

At S1101, the CPU 101 acquires the output file name included in the print job. This output file name is specified by the module of the plug-in 202 at S905. Further, there is a case where the output file name is an output file name specified by some application that has instructed the virtual printer driver 204 to perform printing.

At S1102, the CPU 101 functions as an output file name determination unit and determines whether the output file name acquired at S1101 is described in a specific format. In a case where determination results at this step are affirmative, the processing advances to S1103 and on the other hand, in a case where the determination results are negative, the processing advances to S1105. In the present embodiment, it is assumed that whether the output file name is described in the format represented by equation (1) described previously is determined.

First, a case of YES at S1102 is explained. In this case, at S1103, the CPU 101 extracts "output size width" and "output size length" from the output file name and specifies the output size. In the present embodiment, in a case of receiving the print job including the output file name "WordPlugin_1000_3000.prn" described previously, the CPU 101 acquires the output size width 1,000 mm and the output size length 3,000 mm.

At S1104, the CPU 101 generates printing-target intermediate data by performing image processing accompanied by magnification/reduction processing to magnify/reduce the size up to the output size specified at S1103 for the image data received from the application 201 via the OS. Then, at S1105, the CPU 101 transfers the intermediate data generated at S1104 and the output size specified at S1103 to the layout editing application 205. Specifically, for example, the CPU 101 temporarily stores the generated intermediate data and the output size in a predetermined place within the RAM 103 or the like. In a case where information is stored in the predetermined place, the layout editing application 205 acquires the stored information. Alternatively, it may also be possible to boot the layout editing application 205 and store the intermediate data and the output size at S1105 and for the layout editing application 205 having booted to automatically read the intermediate data and the output size from the above-described predetermined place.

Following the above, a case of NO at S1102 is explained. In this case, at S1106, the CPU 101 generates intermediate data by performing image processing with the same size (that is, not accompanied by magnification/reduction processing) for the image data received from the application 201 via the OS. Then, at S1107, the CPU 101 transfers the intermediate data generated at S1106 to the layout editing application 205. Specifically, for example, the CPU 101 temporarily stores the generated intermediate data in a predetermined place within the RAM 103 or the like. In a case where information is stored in the predetermined place, the layout editing application 205 acquires the stored information. Alternatively, it may also be possible to boot the layout editing application 205 and store the intermediate data at S1107 and for the layout editing application 205 having booted to automatically read the intermediate data from the above-described predetermined place. At S1107, different from S1105, the output size is not transferred to the layout editing application 205. In the present embodiment, in a case where the print job including the output file name "WorldPlugin.prn" described previously is received, NO is determined at S1102 and the processing advances to S1106 as a result.

The intermediate data transferred to the layout editing application 205 by the processing at S1105 or S1107 described above is used for editing of the print layout by the layout editing application 205. Specifically, it is made possible for the layout editing application 205 to process the intermediate data transferred at S1105 or S1107 in accordance with user instructions as to the print layout. Further, in a case where of acquiring the output size at S1105, the layout editing application 205 automatically sets the output size as the sheet size of the print setting.

Then, the layout editing application 205 instructs the printer driver 206 to perform printing by transmitting the print setting and the intermediate data to the printer driver 206. The printer driver 206 converts the intermediate data into print data that can be interpreted by the printer 140 in accordance with the print setting and sends out the print job including the print data and the print setting to the printer 140. Then, the printer 140 prints the print data included in the print job in accordance with the print setting. For example, in a case where the output size is set as the sheet size of the print setting, in the printer 140, an image of the size in accordance with the output size is printed.

As described above, in a case where a user edits the document 305 without changing the sheet size and presses down the Edit/print button after the sheet size is set to the application 201 at S608, YES is determined at S902. Then, by the processing at S903, the file name including the output size is generated, and therefore, YES is determined at S1102 and the processing at S1103 to S1105 is performed. That is, in a case where a user having specified the output size on the screen shown in FIG. 4 desires printing in accordance with the output size and presses down the Edit/print button, intermediate data in accordance with the output size is generated automatically and the output size becomes automatically the sheet size of the print setting. Because of this, it is possible to easily print an image in accordance with the output size by a user instructing the layout editing application 205 to perform printing without the need to perform enlargement processing by the layout editing application 205 or to specify the output size as the print setting. It may also be possible for the layout editing application 205 to instruct the printer driver 206 to perform printing in accordance with the output size without the need to receive printing instructions by a user in a case of acquiring the output size by the processing at S1105. That is, it is possible for a user to cause the printer 140 to print an image in accordance with the output size without the need to give printing instructions again after pressing down the Edit/print button 307.

On the other hand, in a case where a user changes the sheet size and presses down the Edit/print button after the sheet size is set to the application 201 at S608, NO is determined at S902. Further, the processing at S1106 and S1107 is performed by the virtual printer driver 204. At this time, in the layout editing application 205, different from the case where the processing at S1103 to S1105 is performed, intermediate data for which enlargement in accordance with the output size is not performed is the target of processing. Further, the output size is not automatically set as the sheet size of the print setting. For example, a case is assumed where a user specifies an output size on the screen shown in FIG. 4, but the aspect ratio of the document 305 checked by the user on the display shown in FIG. 5 is not a desired one, and the user changes the sheet size of the application 205. In this case, by the processing at S1106 and S1107, it is possible to prevent enlargement processing from being performed automatically in accordance with the output size, which is not the desired one, or the output size, which is not a desired one, from being set automatically as the print setting.

The above is the contents of the processing performed on the virtual printer driver side in a case where the Edit/print button is pressed down in the present embodiment.

<About Effect of the Present Embodiment>

As explained above, the plug-in 202 instructs the virtual printer driver 204 to perform file output printing by using a print file having an output file name in a predetermined format via the application 201. In a case where the output file name is described in the predetermined format, the virtual printer driver 204 having received the print job acquires information relating to the output size from the output file name. At this time, the application 201 instructs the virtual printer driver 204 to perform file output printing by the same processing as that to instruct a normal printer driver, such as the printer driver 206, to perform file output printing. Further, the printer driver 206 acquires a print job from the layout editing application 205 and performs printing control by the same processing as that to acquire a print job from a normal application, such as the application 201, and perform printing control.

Because of this, it is possible to transmit information on an output size not supported by the application as print setting information from the application to the printer driver without the need to modify the application or add an extension API to the printer driver.

Second Embodiment

In the present embodiment, a case is explained where print setting information different from that in the first embodiment is transmitted in the printing system having the plug-in 202 and the virtual printer driver 204, which is explained in the first embodiment. Here, in the present embodiment, it is assumed that in a case where a user presses down the Edit/print button 307 on the application 201, the module of the plug-in 202 displays an Edit/print setting dialog (see FIG. 12). Then, it is assumed that the contents set by a user on an Edit/print setting dialog 1201 are transmitted from the application 201 to the virtual printer driver 204. In the following, differences from the already-described embodiment are explained mainly and explanation of the same contents as those of the already-described embodiment is omitted appropriately.

<About Edit/Print Setting Dialog>

Figure 12:
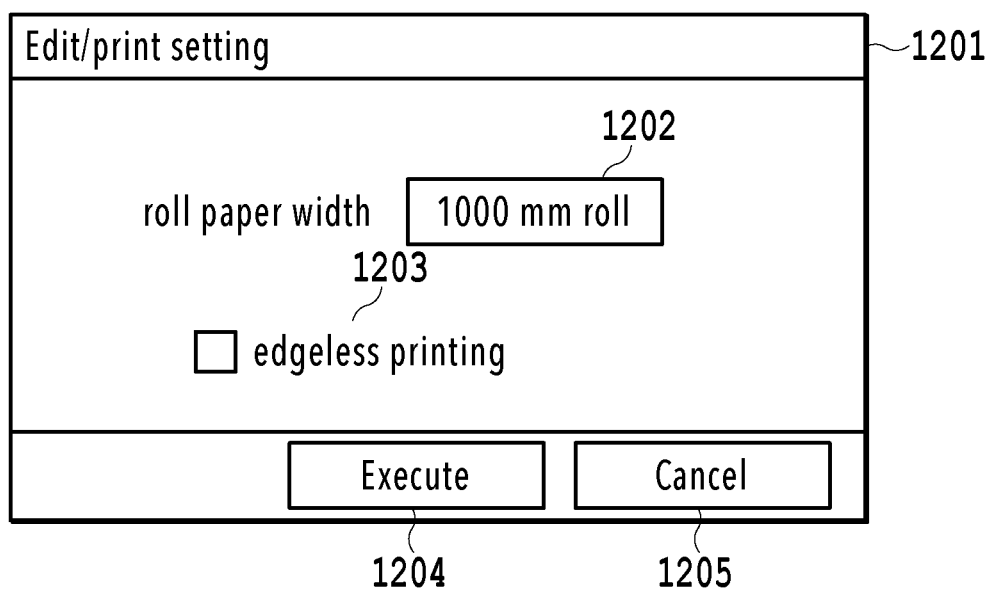
FIG. 12 is a diagram showing an Edit/print setting dialog in a second embodiment.

FIG. 12 is a diagram showing the Edit/print setting dialog 1201. As described previously, in the present embodiment, in a case where a user presses down the Edit/print button 307 in the state where the screen shown in FIG. 3 is displayed on the display 130, the Edit/print setting dialog 1201 is displayed. Further, at this time, the screen receiving an input from a user makes a transition into the Edit/print setting dialog 1201 from the screen shown in FIG. 3.

A roll paper width specification control 1202 is a control to specify the width of the roll paper attached to the print 140 in order to enlarge the width of the document 305 created by a user up to the width of the roll paper included in the printer 140. A check box 1203 is a control to specify to print the document 305 created by a user with no edge.

An Execute button 1204 is a control for instructing the virtual printer driver 204 to perform printing based on the contents set on the Edit/print setting dialog 1201. A Cancel button 1205 is a control for discarding the contents set on the Edit/print setting dialog 1201 and causing the screen receiving an input from a user to make a transition into the screen of the application 201 from the Edit/print setting dialog 1201.

<About Processing in Case Where Edit/Print Button is Pressed Down>

Figure 13:
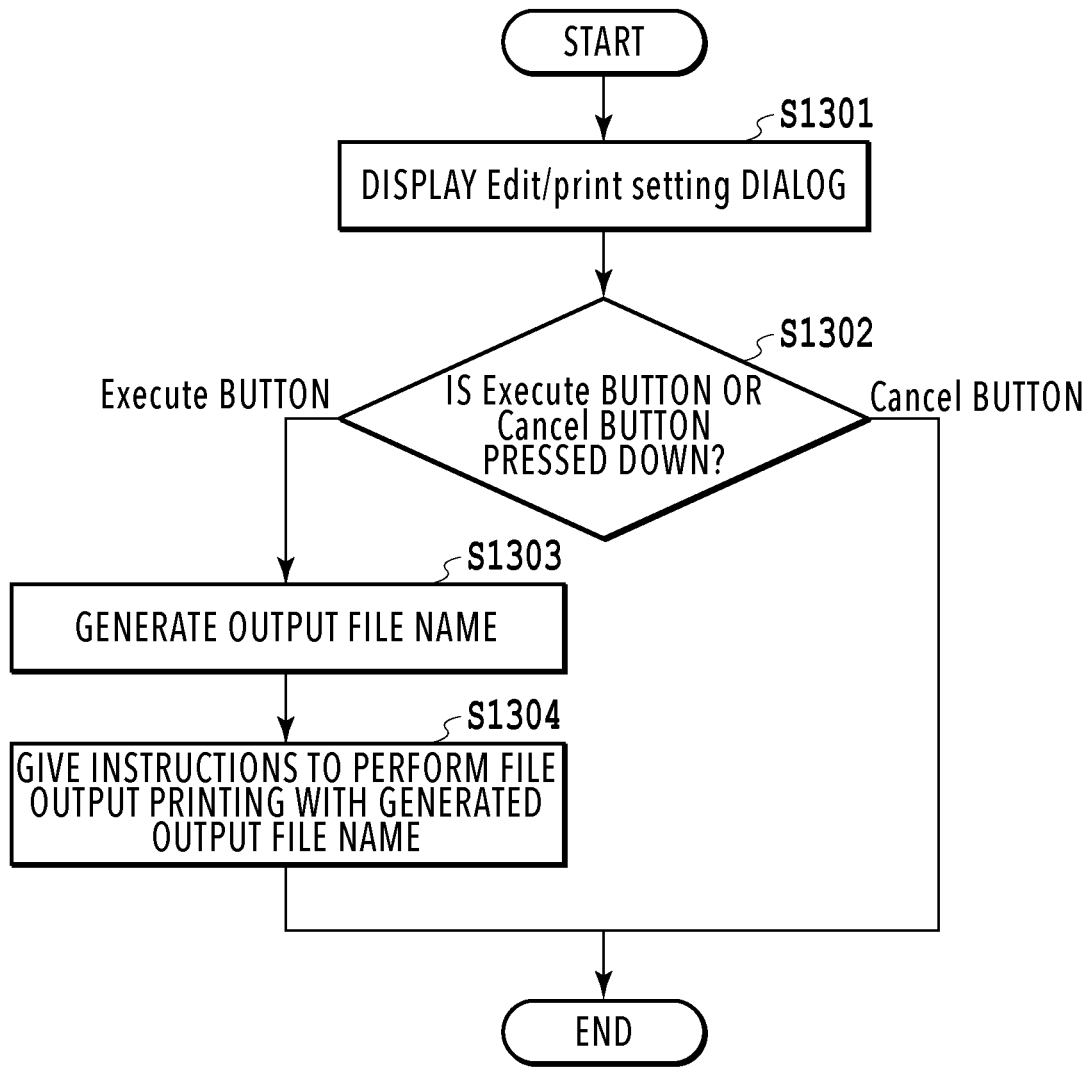
FIG. 13 is a flowchart of processing performed on the side of a plug-in in a case where an Edit/print button is pressed down in the second embodiment.

In the following, a series of processing in a case where the Edit/print button 307 is pressed down is explained by using FIG. 13. Each piece of processing shown in FIG. 13 is performed by a module implemented by the CPU 101 executing the plug-in 202. In a case where a user presses down the Edit/print button 307, the series of processing is started and the processing advances to step S1301.

First, at S1301, the CPU 101 displays the Edit/print setting dialog 1201. After this step, a state is brought about where a user input to the Edit/print setting dialog 1201 is awaited.

In a case where a user presses down the Execute button 1204 or the Cancel button 1205 on the Edit/print setting dialog 1201, at S1302, the CPU 101 determines whether the button pressed down is the Execute button 1204 or the Cancel button 1205. In a case where the Execute button 1204 is pressed down, the processing advances to S1303 and on the other hand, in a case where the Cancel button 1205 is pressed down, the series of processing is terminated.

At S1303, the CPU 101 generates a file name that the CPU 101 specifies as an output file name at the time of instructing the virtual printer driver 204 to perform printing. In the present embodiment, the roll paper width as the output size, which is set on the Edit/print setting dialog 1201, and the edge setting indicating whether or not to perform edgeless printing are input. Then, in accordance with the contents of the input, the CPU 101 generates an output file name in a format including the roll paper width and the edge/edgeless parameter as shown in equation (2) below.

WordPlugin_[roll paper width]_[edge/edgeless parameter].prn     equation (2)

In equation (2), the edge/edgeless parameter takes one of values "0" indicating edge printing and "1" indicating edgeless printing.

At S1304, the CPU 101 instructs the application 201 to perform printing by using the output file name generated at S1303 via the virtual printer driver 204. It is assumed that the same method as that in the first embodiment (S905 in FIG. 9) is adopted as the method of giving printing instructions. Specifically, as the argument "OutputFileName", a file path including the output file name generated at S1303 is specified and "True" is specified for the argument "PrintToFile". The above is the contents of the processing in a case where the Edit/print button is pressed down in the present embodiment.

<About Processing Performed on Virtual Printer Driver Side>

Figure 14:
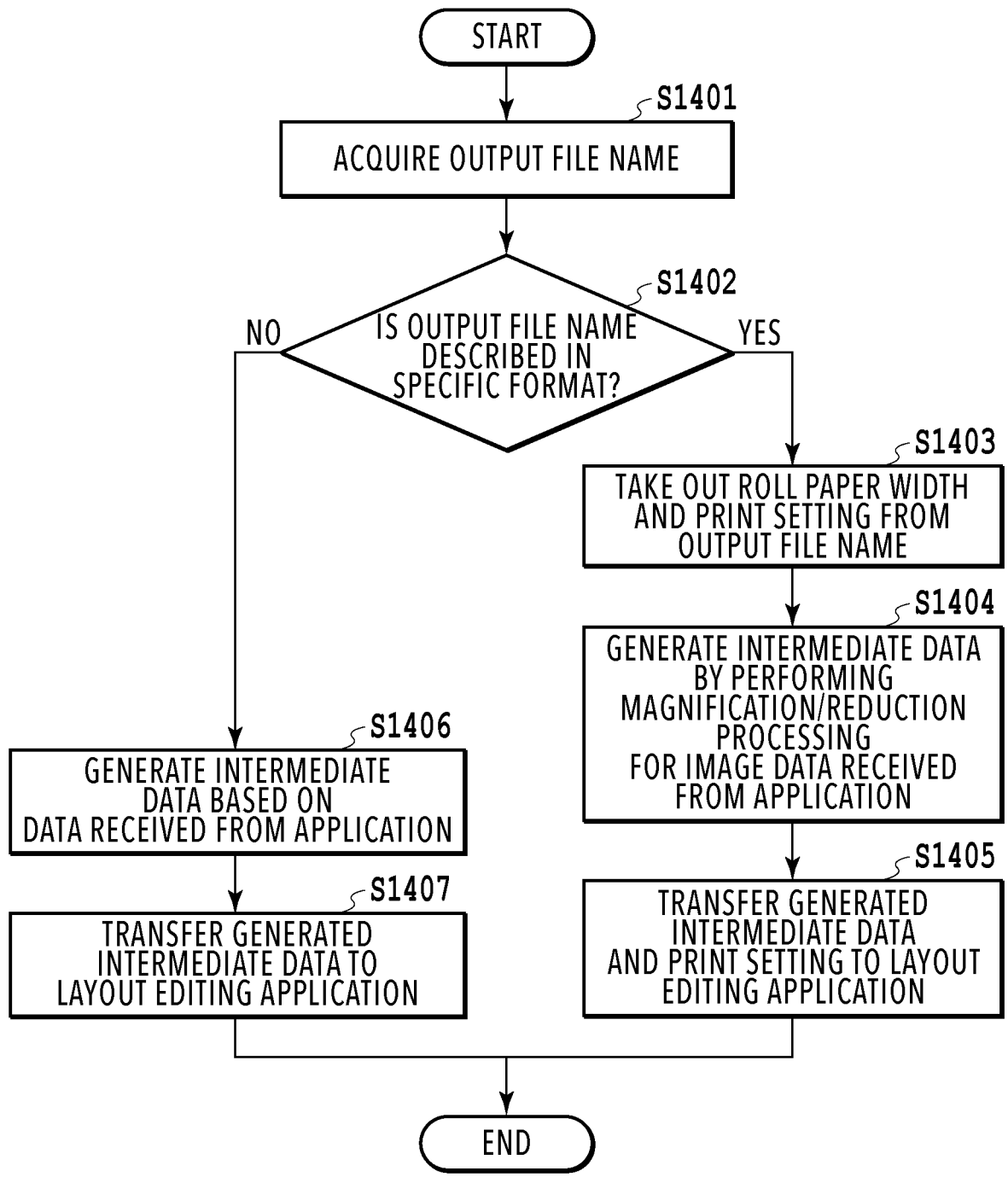
FIG. 14 is a flowchart of processing performed on the side of a virtual printer driver having received a print job in the second embodiment.
Figure 15:
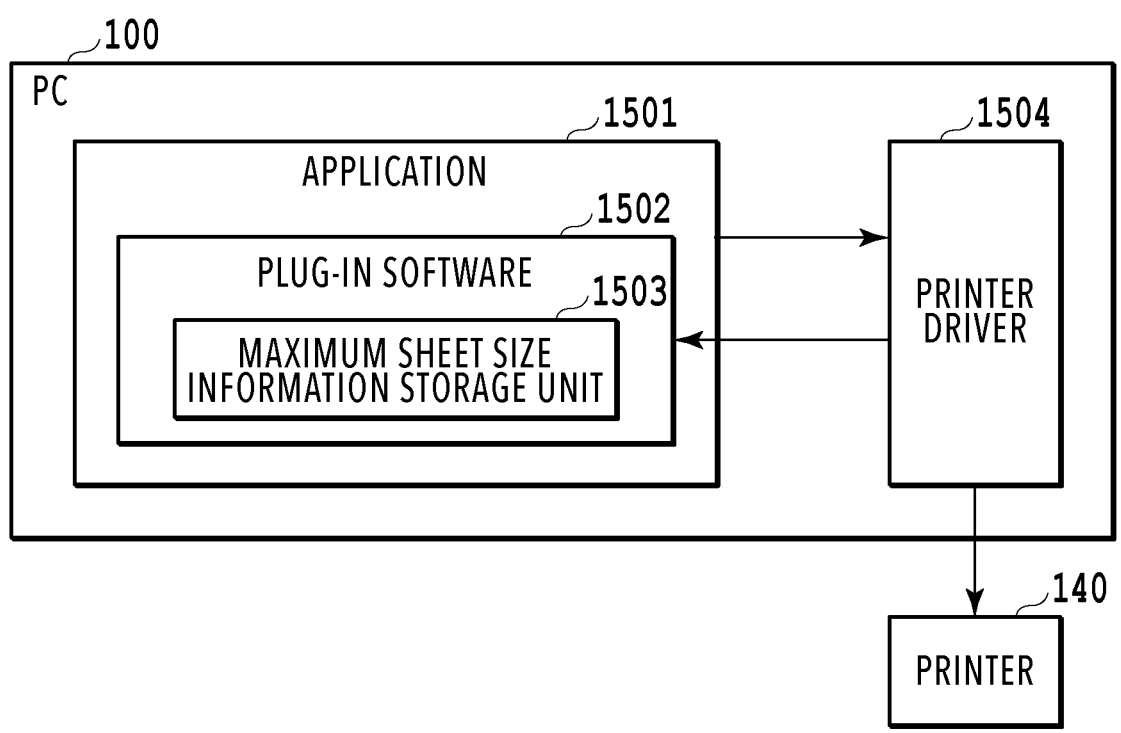
FIG. 15 is a block diagram showing an outline configuration of a printing system in the background art.

In the following, processing performed on the virtual printer driver 204 side having received a print job is explained by using FIG. 14.

At S1401, the CPU 101 acquires the output file name included in the print job. This output file name is specified by the module of the plug-in 202 at S1304. Further, there is a case where the output file name is an output file name specified by some application having instructed the virtual printer driver 204 to perform printing.

At S1402, the CPU 101 determines whether the output file name acquired at S1401 is described in a specific format. In a case where determination results at this step are affirmative, the processing advances to S1403 and on the other hand, in a case where the determination results are negative, the processing advances to S1405. In the present embodiment, it is assumed that the CPU 101 determines whether the output file name is described in the format represented by equation (2) described previously.

First, a case of YES at S1402 is explained. In this case, at S1403, the CPU 101 takes out "roll paper width" and "edge/edgeless parameter" from the output file name.

At S1404, the CPU 101 generates intermediate data by performing image processing accompanied by the processing based the information acquired at S1403 for the image data received from the application 201 via the OS. Specifically, the CPU 101 enlarges/reduces the width of the image so that the width of the image coincides with "roll paper width", enlarges the width of the image to a width whose size is somewhat larger than "roll paper width" so that it is possible for the printer 140 to perform printing with no edge in a case where "edgeless printing" is specified, and so on.

At S1405, the CPU 101 transfers the intermediate data generated at S1404 and the print setting acquired at S1403 to the layout editing application 205. In the print setting, the roll paper width and the edge/edgeless parameter acquired at S1403 are included. The way the information is transferred to the layout editing application 205 is the same as that at S1105. The layout editing application 205 automatically sets the roll paper width and the edge/edgeless parameter acquired by the processing at S1405 as the sheet size of the print setting.

Following the above, a case of NO at S1402 is explained. In this case, at S1406, the CPU 101 generates intermediate data by performing image processing with the same size (that is, not accompanied by magnification/reduction processing) for the image data received from the application 201 via the OS. Then, at S1407, the CPU 101 transferred the intermediate data generated at S1406 to the layout editing application 205. The way the information is transferred to the layout editing application 205 is the same as that at S1107. The above is the contents of the processing performed on the virtual printer driver side in the present embodiment.

In the present embodiment, the example is described in which only the width of the roll paper is specified as the output size, but the example is not limited to this and it may also be possible for the width and the length of a sheet to be specified as in the case with the first embodiment and it may also be possible to specify whether or not to perform edgeless printing.

<About Effect of the Present Embodiment>

By the present embodiment, it is possible to transmit setting information relating to edgeless printing not supported by an application as print setting information from the application to a printer driver without the need to modify the application or to add an extension API to the printer driver.

Other Embodiments

In the embodiments described previously, at the print setting information to be transmitted to a printer driver, information on an output size not supported by an application and setting information relating to edgeless printing are taken. However, information to be transmitted to a printer driver is not limited to this and by the present invention, it is possible to transmit any print setting information to the printer driver.

Further, it may also be possible to configure an embodiment by appropriately combining the embodiments described previously.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

By the present invention, it is possible to transmit any print setting information to a more general printer driver from an application.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-099526, filed May 24, 2018, which is hereby incorporated by reference wherein in its entirety.

What is claimed is:

1. A printing control method performed by an information processing apparatus including first software, second software, and a predetermined application, the method comprising:
   inputting an output size specified by a user;
   determining a file name, based on the inputted output size; and
   instructing the predetermined application to output a print file which includes data created by the predetermined application and has the determined file name,
   wherein the first software generates printing target data by obtaining the data included in the print file and created by the predetermined application and performing enlargement processing on the obtained data based on the file name, and
   wherein the second software generates print data which can be interpreted by a printing apparatus based on the printing target data.

2. The printing control method according to claim 1, further comprising:
   setting a sheet size in an aspect ratio corresponding to the input output size to the predetermined application, wherein
   a page in the aspect ratio is displayed by the predetermined application after the sheet size is set.

3. The printing control method according to claim 2, wherein
   in accordance with a predetermined operation by a user after the sheet size is set, an instruction to output the print file is given.

4. The printing control method according to claim 1, wherein
   a width and a length of a sheet are input as the output size, and
   the file name including the width and the length input is given.

5. The printing control method according to claim 1, wherein
   the output size and an edge setting are input,
   wherein the edge setting relates to an edge of a print medium on which an image is printed based on the generated printing target data,
   the file name corresponding to the output size and the edge setting is determined, and
   wherein the first software generates the printing target data by obtaining the data included in the print file and created by the predetermined application and performing the enlargement processing on the obtained data based on the file name.

6. The printing control method according to claim 1, wherein
   the output size is input using a screen provided by plug-in software registered in the predetermined application.

7. The printing control method according to claim 1, wherein the first software is a virtual driver, and the second software is a printer driver.

8. The printing control method according to claim 1, wherein the printing target data is intermediate data.

9. The printing control method according to claim 8, wherein the second software acquires the intermediate data, via OS(Operating System).

10. A non-transitory computer readable storage medium storing a program, wherein the program causes an information processing apparatus including first software, second software, and a predetermined application to perform a printing control method, comprising
    inputting an output size specified by a user;
    determining a file name, based on the inputted output size; and
    instructing the predetermined application to output a print file which includes data created by the predetermined application and has the determined file name,
    wherein the first software generates printing target data by obtaining the data included in the print file and created by the predetermined application and performing enlargement processing on the obtained data based on the file name, and
    wherein the second software generates print data which can be interpreted by a printing apparatus based on the printing target data.

11. The non-transitory computer readable storage medium according to claim 10, further comprising:
    setting a sheet size in an aspect ratio corresponding to the input output size to the predetermined application, wherein
    a page in the aspect ratio is displayed by the predetermined application after the sheet size is set.

12. The non-transitory computer readable storage medium according to claim 11, wherein
    in accordance with a predetermined operation by a user after the sheet size is set, an instruction to output the print file is given.

13. The non-transitory computer readable storage medium according to claim 10, wherein
    a width and a length of a sheet are input as the output size, and
    the file name including the width and the length input is determined.

14. The non-transitory computer readable storage medium according to claim 10, wherein
    the output size and an edge setting are input,
    wherein the edge setting relates to an edge of a print medium on which an image is printed based on the generated printing target data,
    the file name corresponding to the output size and the edge setting is determined, and
    wherein the first software generates the printing target data by obtaining the data included in the print file and created by the predetermined application and performing the enlargement processing on the obtained data based on the file name.

15. The non-transitory computer readable storage medium according to claim 10, wherein
    the output size is input using a screen provided by plug-in software registered in the predetermined application.

16. The non-transitory computer readable storage medium according to claim 10, wherein the first software is a virtual driver, and the second software is a printer driver.

17. The non-transitory computer readable storage medium according to claim 10, wherein the printing target data is intermediate data.

18. The printing control method according to claim 17, wherein the second software acquires the intermediate data, via OS(Operating System).

19. An information processing apparatus including first software, second software, and a predetermined application, the apparatus comprising:
- a memory configured to store a program;
- at least one processor configured to execute the stored program to:
- input an output size specified by a user;
- determine a file name based on the inputted output size; and
- instruct the predetermined application to output a print file which includes data created by the predetermined application with a file name,
- wherein the first software generates printing target data by obtaining the data included in the print file and created by the predetermined application and performing enlargement processing on the obtained data based on the file name, and
- wherein the second software generates print data which can be interpreted by a printing apparatus based on the printing target data.

* * * * *